US012623711B2

(12) United States Patent
    Bodtker et al.

(10) Patent No.: US 12,623,711 B2
(45) Date of Patent: May 12, 2026

(54) ENERGY ABSORPTION STRAP INTEGRATED WITH A TELESCOPE DRIVE BRACKET

(71) Applicant: Steering Solutions IP Holding Corporation, Saginaw, MI (US)

(72) Inventors: Joen C. Bodtker, Flint, MI (US); Melvin L. Tinnin, Clio, MI (US); Jorge Flores Garay, Saginaw, MI (US); Joseph R. Streng, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 19/197,507

(22) Filed: May 2, 2025

(65) Prior Publication Data

US 2025/0256760 A1      Aug. 14, 2025

Related U.S. Application Data

(62) Division of application No. 18/530,601, filed on Dec. 6, 2023, now Pat. No. 12,337,893.

(51) Int. Cl.
    *B62D 1/19*        (2006.01)
    *F16F 7/12*        (2006.01)

(52) U.S. Cl.
    CPC .............. *B62D 1/195* (2013.01); *F16F 7/123* (2013.01)

(58) Field of Classification Search
    CPC .......... B62D 1/181; B62D 1/185; B62D 1/19; B62D 1/192; B62D 1/195; F16F 7/123
    See application file for complete search history.

(56) References Cited

U.S. PATENT DOCUMENTS

| | | | | | |
|---|---|---|---|---|---|
| 9,969,345 | B2 * | 5/2018 | Dubay | ..................... | F16F 7/128 |
| 11,104,370 | B2 * | 8/2021 | Buzzard | ................... | F16F 7/125 |
| 12,291,262 | B2 * | 5/2025 | Raich | ..................... | B62D 1/195 |
| 12,337,893 | B1 * | 6/2025 | Bodtker | ................. | B62D 1/192 |

* cited by examiner

*Primary Examiner* — Laura Freedman
(74) *Attorney, Agent, or Firm* — Dickinson Wright PLLC

(57)          ABSTRACT

A steering column assembly includes a lower jacket. The steering column assembly also includes an upper jacket disposed within the lower jacket and being telescopingly adjustable relative to the lower jacket. The steering column assembly further includes a telescope drive assembly electrically moving a telescope drive nut axially to telescopingly adjust the upper jacket. The steering column assembly yet further includes an energy absorption strap directly coupled to the upper jacket and directly coupled to the telescope drive nut to transfer axial movement of the telescope drive nut to the upper jacket.

5 Claims, 6 Drawing Sheets

ENERGY ABSORPTION STRAP INTEGRATED WITH A TELESCOPE DRIVE BRACKET

CROSS-REFERENCE TO RELATED APPLICATION

This application is a divisional application of, and claims priority to, U.S. application Ser. No. 18/530,601, filed Dec. 6, 2023, the disclosure of which is incorporated by reference herein in its entirety.

TECHNICAL FIELD

The following description relates to energy absorption devices for steering columns and, more particularly, to an energy absorption strap integrated with telescope drive bracket for a steering column assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Steering columns often include various safety features, such as airbags to lessen impact forces. In addition, many steering column assemblies are collapsible and include one or more energy absorption features, such as energy absorption straps. Some energy absorption straps are configured to roll along their length to absorb energy, and are often referred to as roll straps. Typically, roll straps absorb energy during the deformation of the strap in an impact event wherein kinetic energy can be dissipated through compression of the steering column assembly.

In power telescoping (i.e., translating) steering columns, a drive bracket is used to connect a telescope actuator to an upper jacket to carry out telescoping motion of the upper jacket relative to a lower jacket. The energy absorption function is achieved with the above-described energy absorption strap, which is a separate component housed within a drive bracket. The drive bracket is frangibly connected to the upper jacket to release at a prescribed load in order to allow the energy absorption strap to engage and become the load path. Typically, a collection of connecting parts is included in the overall assemblies of the telescope drive bracket and the energy absorption strap assembly. The number of parts, combined with the associated assembly steps adds cost and assembly complexity to the overall system.

SUMMARY

According to one aspect of the disclosure, a steering column assembly includes a lower jacket. The steering column assembly also includes an upper jacket disposed within the lower jacket and being telescopingly adjustable relative to the lower jacket. The steering column assembly further includes a telescope drive assembly electrically moving a telescope drive nut axially to telescopingly adjust the upper jacket. The steering column assembly yet further includes an energy absorption strap directly coupled to the upper jacket and directly coupled to the telescope drive nut to transfer axial movement of the telescope drive nut to the upper jacket.

According to another aspect of the disclosure, an energy absorption strap for a vehicle steering column includes a radially outer leg including a first radially extending flange and a second radially extending flange. The energy absorption strap also includes a central leg. The energy absorption strap further includes a radially inner leg. The energy absorption strap further includes a first curved segment connecting the radially outer leg and the central leg. The energy absorption strap yet further includes a second curved segment connecting the central leg and the radially inner leg.

According to another aspect of the disclosure, a method of assembling an energy absorption strap to a steering column is provided. The method includes orienting the energy absorption strap perpendicular to a longitudinal axis of the steering column. The method also includes positioning a locking tab within an hourglass shaped aperture defined by an upper jacket of the steering column. The method further includes rotating the energy absorption strap 90 degrees to orient the energy absorption strap parallel to the longitudinal axis of the steering column.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering systems, for example, steer-by-wire and driver interface steering. These steering system systems typically include a steering column assembly for translating steering input to an output that interacts with a steering linkage to ultimately cause the vehicle wheels to turn. Steering columns include various safety features, such as airbags to lessen impact forces. In addition, many steering columns are collapsible and include one or more energy absorption features, such as energy absorption straps, which allow a certain amount of compression.

Figure 1:
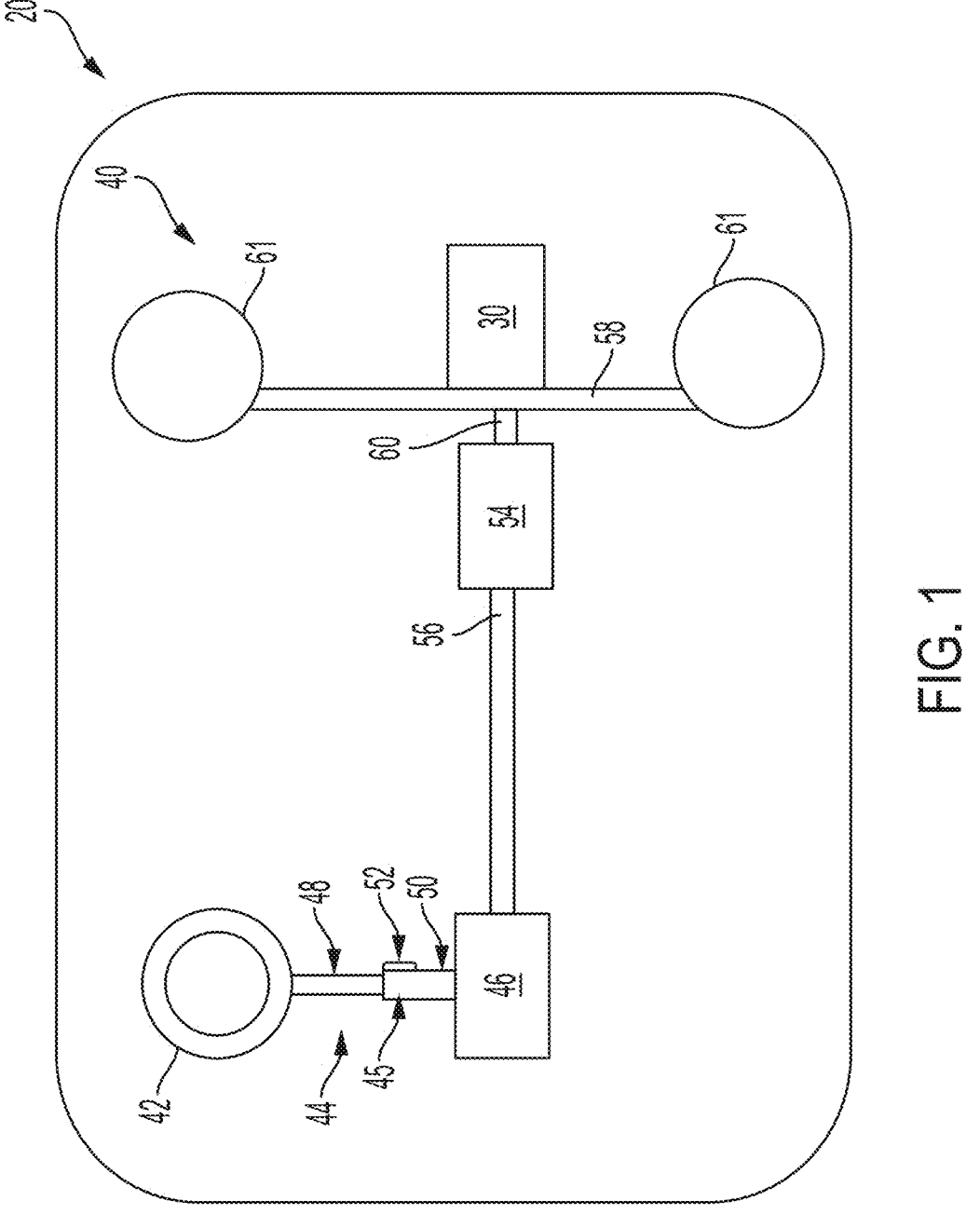
FIG. 1 schematically illustrates a vehicle with a steering system.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 may include a steering column 45 that extends along a longitudinal axis A from the input device 42 to an output assembly 46. The output assembly 46 may include a pinion shaft assembly, an I-shaft, a cardan joint, steer-by-wire components or any other features conventionally located opposite the input device 42.

The steering column 45 may include at least two axially adjustable portions, for example, an upper jacket 48 and a lower jacket 50 that are axially adjustable with respect to one another. The upper jacket 48 and the lower jacket 50 are permitted to move axially with respect to one another during an impact or other compressive forces. The relative axial movement is described herein as being telescoping, wherein the upper jacket 48 telescopes within the lower jacket 50 over a range of axial positions from an extended column position to a retracted column position. The steering column assembly 44 may include additional portions provide rake and/or tilt movement.

An energy absorption apparatus 52 is coupled to the upper jacket 48 to provide variable stroke load absorption settings. During a collapse event, a force may move or collapse the upper jacket 48 along the longitudinal axis A of the steering column 45 and the energy absorption apparatus 52 dissipates at least some of the kinetic energy of collapsing first jacket 48 and the second jacket 50. The details of the energy absorption apparatus 52 are described herein.

A steering gear assembly 54 may connect to the output assembly 46 via a steering gear input shaft 56. The steering gear assembly 54 may be configured as a rack-and-pinion, a recirculating ball-type steering gear, or any other type of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 61.

Figure 2:
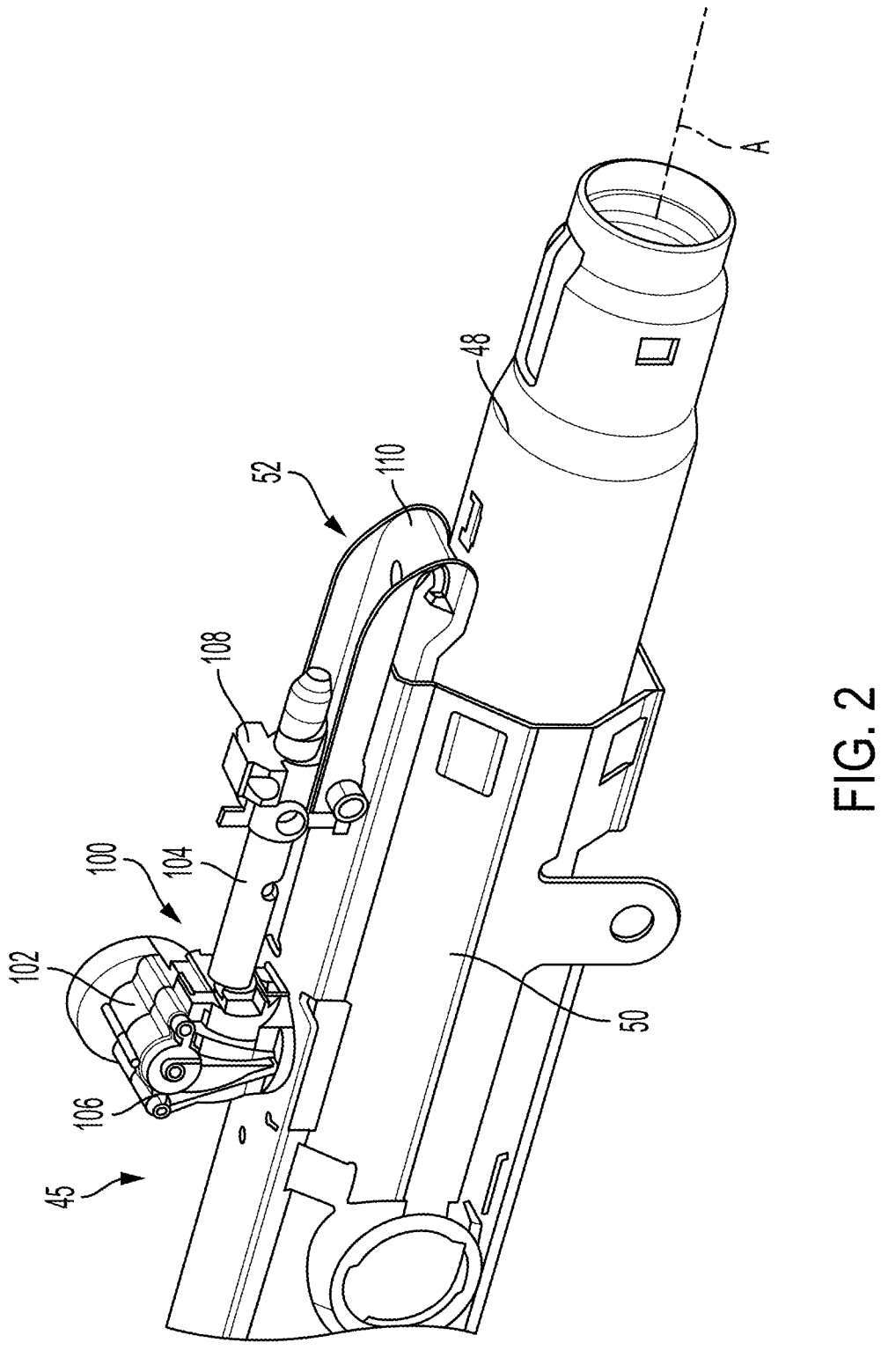
FIG. 2 is a perspective view of a portion of a steering column having a power telescope assembly and an energy absorption strap, with the energy absorption strap having a telescope drive bracket integrally formed therein.

FIG. 2 illustrates a portion of the steering column 45, the energy absorption apparatus 52 and a telescope drive assembly 100. The telescope drive assembly 100 is a powered actuator which actuates telescoping movement of the upper jacket 48 relative to the lower jacket 50. The telescope drive assembly 100 includes an electric actuator 102, such as an electric motor, that drives rotational movement of a threaded rod 104. A gearbox 106 may facilitate the transfer of power from an output shaft (not shown) of the electric actuator 102 to the threaded rod 104. Rotation of the threaded rod 104 results in translation of a telescope drive nut 108 which is threaded to an outer surface of the threaded rod 104. Translation of the telescope drive nut 108 is generally parallel to the longitudinal axis A of the steering column 45.

The energy absorption apparatus 52 includes an energy absorption strap 110 (EA strap 110) which is directly coupled to the upper jacket 48. As described herein, the telescope drive nut 108 is directly coupled to the EA strap 110. Unlike prior steering systems, the embodiments disclosed herein do not require a component which is often referred to as a telescope drive bracket. Additionally, several coupling connecting components, such as rivets, brackets and weld plates, are not required in the embodiments disclosed herein, thereby reducing system cost and assembly complexity.

Figure 4:
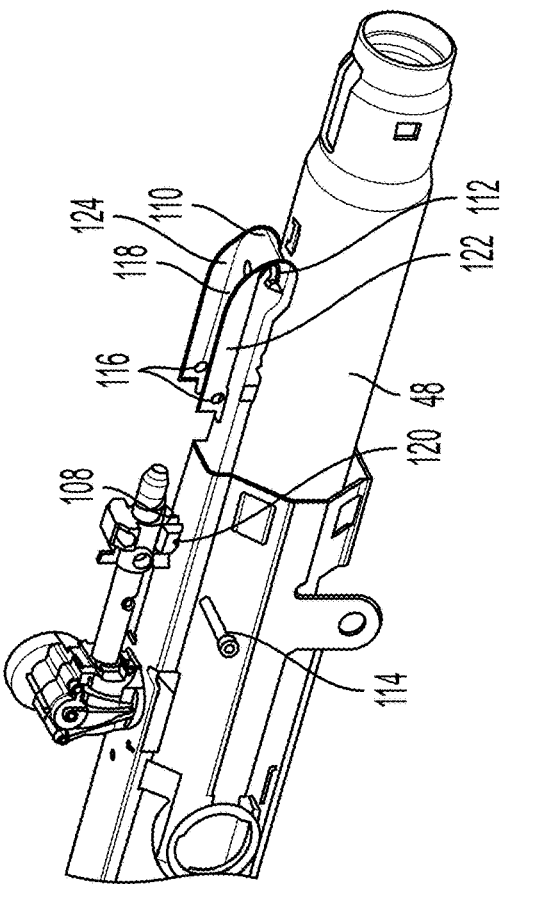
FIG. 4 illustrates a second partially disassembled condition of an energy absorption strap and the power telescope assembly.
Figure 3:
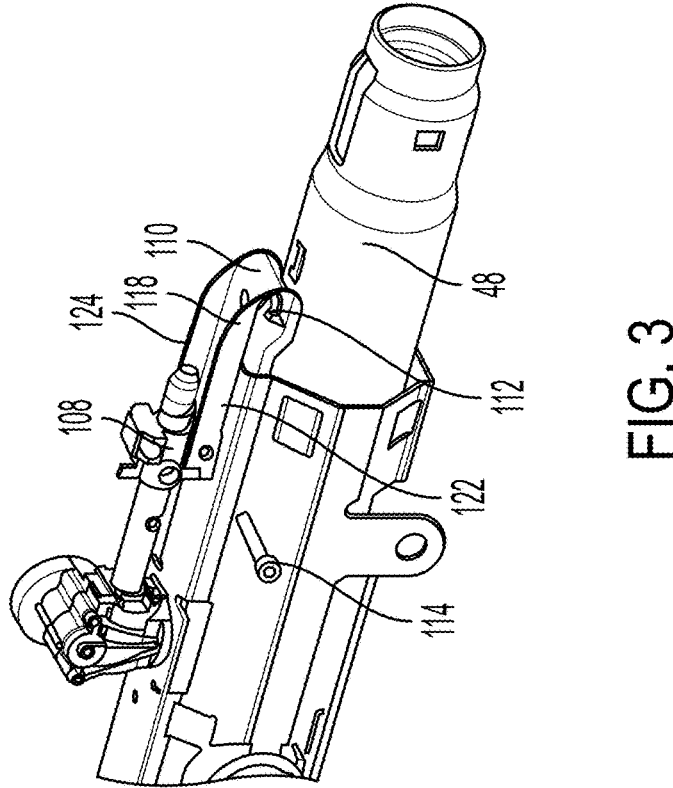
FIG. 3 illustrates a first partially disassembled condition of an energy absorption strap and the power telescope assembly.

Referring now to FIGS. 3 and 4, the EA strap 110 is shown assembled to the upper jacket 48 with an anti-lift fastener 112, but is still disassembled from the telescope drive nut 108. As shown, the upper jacket 48 axially telescopes with the lower jacket 50 and a portion of the EA strap 110 remains radially outward of the lower jacket 50 once moved to the assembled position (FIG. 3), where a fastener 114 may be inserted through a pair of holes 116 defined by a radially outer leg 118 of the EA strap 110 and through a hole 120 defined by the telescope drive nut 108. As shown in FIG. 3, the radially outer leg 118 of the EA strap 110 includes a first radially extending flange 122 and a second radially extending flange 124. The space defined between the first and second radially extending flanges 122, 124 of the radially outer leg 118 is sufficient to seat a portion of the telescope drive nut 108 therein. The telescope drive nut 108 is positioned to align the hole 120 of the telescope drive nut 108 with the pair of holes 116 of the radially outer leg 118 of the EA strap 110 for insertion of the fastener 114 to directly couple the telescope drive nut 108 to the EA strap 110. The direct coupling of the telescope drive nut 108 to the EA strap 110, combined with direct coupling of the EA strap 110 to the upper jacket 48 results in the radially outer leg 118 of the EA strap 110 functioning as a telescope drive bracket, as axial movement of the telescope drive nut 108 along the threaded rod 104 directly actuates telescope movement of the upper jacket 48 relative to the lower jacket 50.

Figures 5, 6, 7, 8, 9, 10:
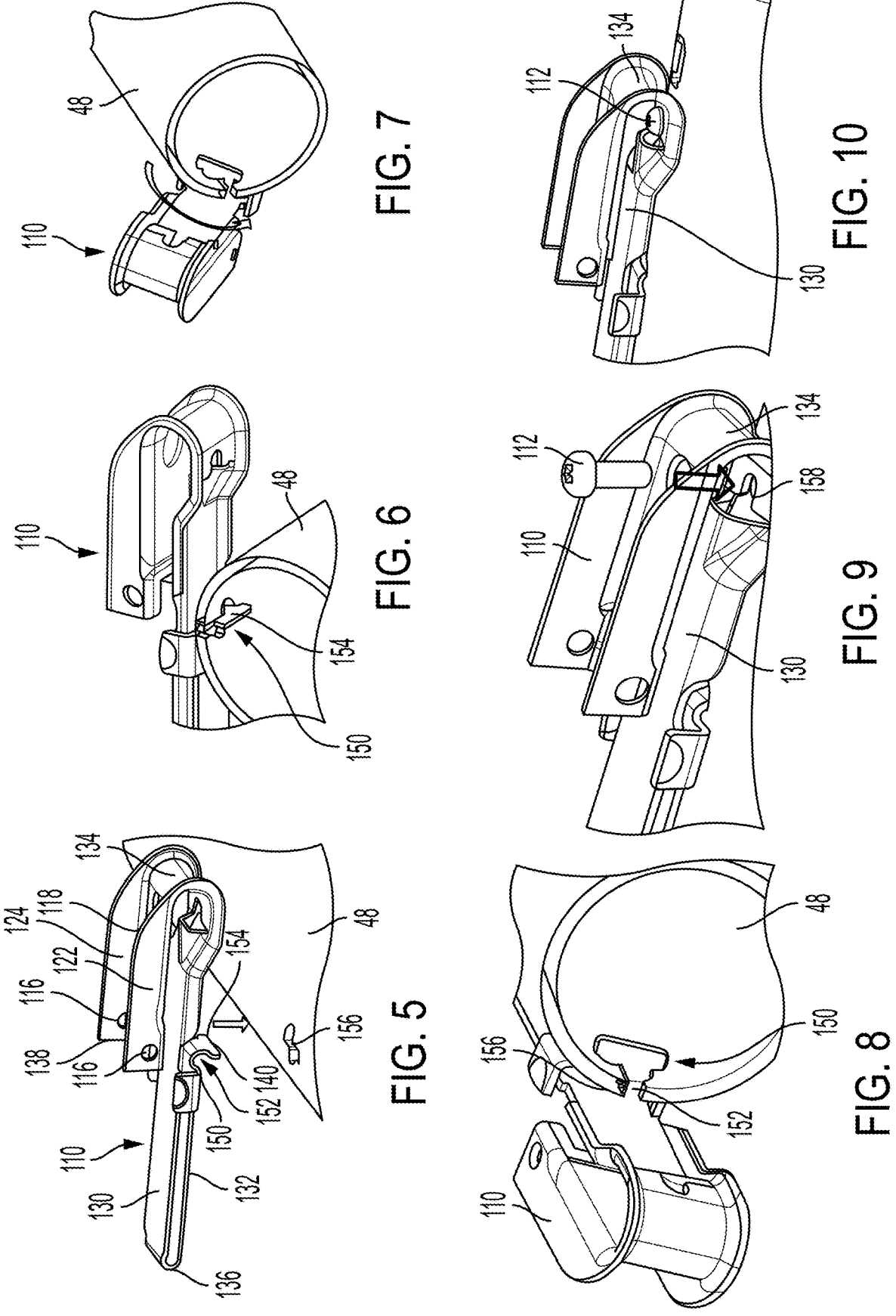
FIGS. 5-10 illustrate an assembly sequence of the energy absorption strap to the upper jacket and to a telescope drive nut.

Referring now to FIG. 5, the EA strap 110 includes the radially outer leg 118, a central leg 130, and a radially inner leg 132. The radially outer leg 118 is connected to the central leg 130 with a first curved segment 134. The radially inner leg 132 is connected to the central leg 130 with a second curved segment 136. Therefore, the EA strap 110 is generally S-shaped. The EA strap 110 extends from a first terminal end 138, which is an end of the radially outer leg 118, to a second terminal end 140, which is an end of the radially inner leg 132. As described above, the pair of holes 116 defined by the first and second radially extending flanges 122, 124 are located proximate the first terminal end 138 of the EA strap 110. The EA strap 110 includes a locking tab 150 proximate the second terminal end 140 of the EA strap 110. The locking tab 150 includes a stem 152 extending radially inwardly (i.e., toward the longitudinal axis A) from the radially inner leg 132. The locking tab 150 also includes a head segment 154 extending radially inwardly from the stem 152. The head segment 154 has a larger width than the stem 152 to form a generally T-shaped structure.

FIGS. 5-10 illustrate an assembly sequence of the EA strap 110 to the upper jacket 48. To assemble the EA strap 110 to the upper jacket 48, the longitudinal direction of the EA strap is initially oriented substantially perpendicular to the longitudinal axis A of the steering column 45, with the locking tab 150 aligned with an aperture 156 defined by the upper jacket 48 (FIG. 5). The aperture 156 is in a substantially "hourglass" shape. Based on the shape of the aperture 156 and the locking tab 150, the head segment 154 of the locking tab 150 can be fully inserted through the aperture 156 while the EA strap 110 is still oriented perpendicularly to the longitudinal axis A of the steering column 45 (FIG. 6). The EA strap 110 is then rotated 90 degrees to orient the EA strap 110 substantially parallel to the longitudinal axis A of the steering column 45 (FIG. 7). In this orientation, the stem 152 of the locking tab 150 is in tight contact with the inner wall of the hourglass aperture 156 (FIG. 8). The anti-lift fastener 112 is aligned with an energy absorption slot 158 defined by the central leg 130 of the EA strap 110 proximate the first curved segment 134 (FIG. 9) and then secured to the central leg 130 (FIG. 10). The locking tab 150 and the anti-lift fastener 112 directly couple the EA strap 110 to the upper jacket 48. The energy absorption slot 158 and the central leg 130 are shaped to allow a head of the anti-lift fastener 112 to be seated below a plane of the central leg 130 to allow the head of the anti-lift fastener 112 to pass freely under the central leg 130 during a collapse function of the EA strap 110.

Figures 11, 12:
FIG. 11 is a perspective view of a portion of the energy absorption strap disposed within a tunnel defined by the lower jacket with an upper section of the energy absorption strap removed for clarity.
FIG. 12 is a perspective view of a portion of the energy absorption strap illustrating upper jacket anti-roll physics.

Referring now to FIG. 11, a portion of the lower jacket 50 is shown transparently to illustrate a tunnel 160 defined by the lower jacket 50 and a radially outer surface of the upper jacket 48. The central leg 130 and the radially inner leg 132 of the EA strap 110 are at least partially positioned within the tunnel 160 in a fully assembled position. The radially inner leg 132 of the EA strap 110 includes a pair of anti-roll tabs 162 extending outward from the radially inner leg 132, as also shown in FIG. 5. The anti-roll tabs 162 are dimensioned to contact inner lower jacket walls 164 of the tunnel 160 to prevent rolling of the upper jacket 48 relative to the lower jacket 50. The anti-roll tabs 162 are resilient to compensate for manufacturing size variation.

FIG. 12 illustrates the physics associated with the anti-roll measures provided by the embodiments disclosed herein. In particular, an applied roll load F from the upper jacket 48 is shown with a resultant yaw torque T. However, the anti-roll tabs 162 provide a reaction load L. The reaction load L provided by anti-roll tabs 162, combined with the yaw counter force C provided by the anti-lift fastener 112 balance the issue associated with upper jacket roll.

Figure 13:
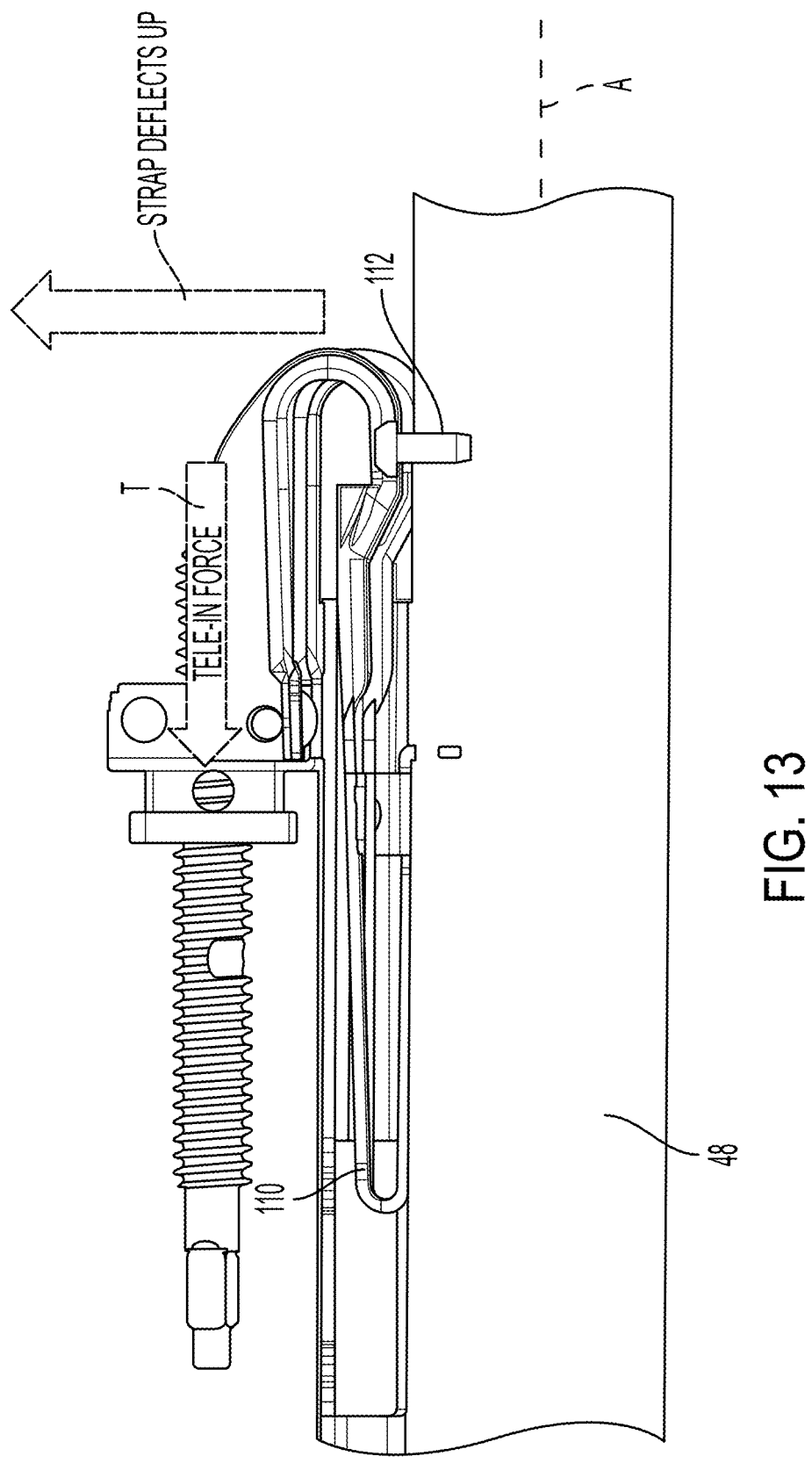
FIG. 13 is an elevation view of the energy absorption strap illustrating strap anti-lift physics.

FIG. 13 illustrates the physics associated with the anti-lift measures provided by the embodiments disclosed herein. In particular, during telescope adjustment of the upper jacket 48, a force T substantially parallel to the longitudinal axis A of the steering column 45 is produced, which results in an end of the EA strap 110 being forced upward. However, the anti-lift fastener 112 balances this force.

The embodiments disclosed herein advantageously reduces cost and assembly complexity of the overall steering system.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing.

What is claimed is:

1. A method of assembling an energy absorption strap to a steering column comprising:
   orienting the energy absorption strap perpendicular to a longitudinal axis of the steering column;
   positioning a locking tab within an hourglass shaped aperture defined by an upper jacket of the steering column; and
   rotating the energy absorption strap 90 degrees to orient the energy absorption strap parallel to the longitudinal axis of the steering column.

2. The method of claim 1, further comprising inserting an anti-lift fastener within a slot defined by the energy absorption strap and into the upper jacket.

3. The method of claim 1, further comprising directly coupling the energy absorption strap to a telescope drive nut of a telescope drive assembly.

4. The method of claim 1, wherein the locking tab comprises a stem and a head segment to form a T-shaped geometry, further comprising positioning the head segment within an inner cavity defined by the upper jacket.

5. The method of claim 4, wherein the stem is positioned within the hourglass shaped aperture defined by the upper jacket.

* * * * *